US012795611B2

(12) United States Patent
Hong et al.

(10) Patent No.: US 12,795,611 B2
(45) Date of Patent: Nov. 10, 2026

(54) METHOD AND DEVICE FOR RESOURCE SENSING AND SELECTION IN SIDELINK COMMUNICATION SUPPORTING DRX OPERATION

(71) Applicants: HYUNDAI MOTOR COMPANY, Seoul (KR); KIA CORPORATION, Seoul (KR); WONKWANG UNIVERSITY CENTER FOR INDUSTRY-ACADEMY COOPERATION, Iksan-si (KR)

(72) Inventors: Ui Hyun Hong, Hwaseong-si (KR); Gene Back Hahn, Hwaseong-si (KR); Hyuk Min Son, Iksan-si (KR)

(73) Assignees: HYUNDAI MOTOR COMPANY, Seoul (KR); KIA CORPORATION, Seoul (KR); WONKWANG UNIVERSITY CENTER FOR INDUSTRY-ACADEMY COOPERATION, Ikran-si (KR)

( * ) Notice: Subject to any disclaimer, the term of this patent is extended or adjusted under 35 U.S.C. 154(b) by 362 days.

(21) Appl. No.: 18/367,271

(22) Filed: Sep. 12, 2023

(65) Prior Publication Data

US 2023/0422217 A1 Dec. 28, 2023

Related U.S. Application Data

(63) Continuation of application No. PCT/KR2022/004065, filed on Mar. 23, 2022.

(30) Foreign Application Priority Data

Mar. 23, 2021 (KR) ........................ 10-2021-0037598

(51) Int. Cl.
*H04W 72/02* (2009.01)
*H04W 76/28* (2018.01)

(52) U.S. Cl.
CPC ........... *H04W 72/02* (2013.01); *H04W 76/28* (2018.02)

(58) Field of Classification Search
CPC ....... H04W 72/02; H04W 76/28; H04W 4/40; H04W 72/40; H04W 74/0808;
(Continued)

(56) References Cited

U.S. PATENT DOCUMENTS 11,516,876 B2 11/2022 Hosseini et al.
2021/0059005 A1 2/2021 Hosseini et al.
(Continued)

FOREIGN PATENT DOCUMENTS

WO 2021034966 A1 2/2021

OTHER PUBLICATIONS

Apple, Discussion on remaining issues on SL DRX Configuration, R2-2100862, 3GPP TSG RAN WG2 Meeting #113-e, 2021; pp. 1-4.
(Continued)

*Primary Examiner* — Jae Y Lee
(74) *Attorney, Agent, or Firm* — Lempia Summerfield Katz LLC

(57) ABSTRACT

A method and a device for resource sensing and selection in sidelink communication supporting a DRX operation are provided. A method for operation of a first terminal includes performing a resource sensing operation in consideration of a DRX cycle of a second terminal in which a DRX operation is performed. The method also includes performing a resource selection operation on the basis of the result of the resource sensing operation in an on-duration period within the DRX cycle. The method additionally includes performing sidelink communication with the second terminal by using transmission resources selected by means of the resource selection operation.

7 Claims, 7 Drawing Sheets

| | first terminal | second terminal | DRX operation modes |
|---|---|---|---|
| Case 1 | DRX operations possible | DRX operations possible | per-direction DTRX operation<br>per-direction DRX operation<br>bi-directional DTRX operation<br>No DRX operation |
| Case 2 | DRX operations impossible | DRX operations possible | per-direction DRX operation<br>No DRX operation |
| Case 3 | DRX operations possible | DRX operations impossible | per-direction DTRX operation<br>No DRX operation |
| Case 4 | DRX operations impossible | DRX operations impossible | No DRX operation |

(58) Field of Classification Search
CPC ..... H04W 92/18; H04W 72/25; H04W 72/51; H04W 72/53; H04W 76/14
See application file for complete search history.

(56) References Cited

U.S. PATENT DOCUMENTS

| | | | | |
|---|---|---|---|---|
| 2022/0015186 | A1* | 1/2022 | Jeong | H04L 1/1896 |
| 2022/0110060 | A1* | 4/2022 | Yang | H04W 72/02 |
| 2022/0173854 | A1* | 6/2022 | Chae | H04L 1/1896 |
| 2023/0063472 | A1* | 3/2023 | Freda | H04W 52/0229 |
| 2023/0180271 | A1* | 6/2023 | Guo | H04W 72/0446 370/329 |
| 2023/0209646 | A1 | 6/2023 | Hosseini et al. | |
| 2023/0388054 | A1* | 11/2023 | Wang | H04L 5/0055 |
| 2023/0403681 | A1* | 12/2023 | Wen | H04W 52/0216 |

OTHER PUBLICATIONS

CATT, GOHIGH, Discussion on resource allocation for power saving, R1-2100351, 3GPP TSG RAN WG1 Meeting #104-e; 2021; 1-14 pp.

Fujitsu, Considerations on Partial Sensing and DRX in NR V2X, R1-2101788, 3GPP TSG RAN WG1 Meeting #104-e; 2021; 1-23 pp.

International Search Report and Written Opinion cited in corresponding PCT application No. PCT/KR2022/004065; Jun. 30, 2022; 11 pp.

LG Electronics Inc., Discussion on SL DRX wake-up time alignment between inter-UEs, R2-2101706, 3GPP TSG RAN WG2 Meeting #113-e; 2021; 1-3 pp.

ZTE / SANECHIPS, Discussion on [104-e-NR-R17-SL-LS-01], R1-2102024, 3GPP TSG RAN WG1 Meeting #104-e; 2021; 1-7 pp.

* cited by examiner

FIG. 10

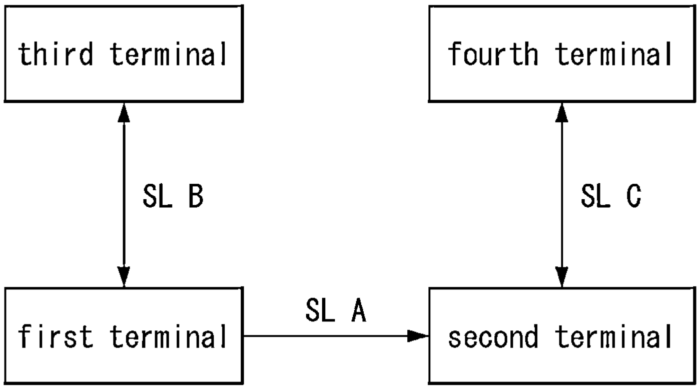

FIG. 11

| | first terminal | second terminal | DRX operation modes |
|---|---|---|---|
| Case 1 | DRX operations possible | DRX operations possible | per-direction DTRX operation<br>per-direction DRX operation<br>bi-directional DTRX operation<br>No DRX operation |
| Case 2 | DRX operations impossible | DRX operations possible | per-direction DRX operation<br>No DRX operation |
| Case 3 | DRX operations possible | DRX operations impossible | per-direction DTRX operation<br>No DRX operation |
| Case 4 | DRX operations impossible | DRX operations impossible | No DRX operation |

METHOD AND DEVICE FOR RESOURCE SENSING AND SELECTION IN SIDELINK COMMUNICATION SUPPORTING DRX OPERATION

CROSS-REFERENCE TO RELATED APPLICATION

This application is a continuation of International Application No. PCT/KR2022/004065 filed on Mar. 23, 2022, which claims priority to Korean Patent Application No. 10-2021-0037598 filed on Mar. 23, 2021, the entire disclosures of which are incorporated herein by reference.

TECHNICAL FIELD

The present disclosure relates generally to a sidelink communication technique, and more particularly, to a technique for resource sensing and selection in sidelink communication supporting discontinuous reception (DRX) operations.

BACKGROUND

A fifth-generation (5G) communication system (e.g., New Radio (NR) communication system) which uses a frequency band higher than a frequency band of a fourth-generation (4G) communication system (e.g., Long Term Evolution (LTE) communication system or LTE-Advanced (LTE-A) communication system) as well as the frequency band of the 4G communication system has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication systems, the V2X communications (e.g., C-V2X communications) may be performed based on sidelink communication technologies (e.g., Proximity-based Services (ProSe) communication technology, Device-to-Device (D2D) communication technology, or the like). For example, sidelink channels for vehicles participating in V2V communications can be established, and communications between the vehicles can be performed using the sidelink channels. Sidelink communication may be performed using configured grant (CG) resources. The CG resources may be periodically configured, and periodic data (e.g., periodic sidelink data) may be transmitted using the CG resources.

SUMMARY

Sidelink communication may support a discontinuous reception (DRX) operation. In this case, resource sensing and selection operations considering the DRX operation may be required. In addition, the DRX operation needs to be configured in consideration of a resource sensing period and/or a resource selection period.

Embodiments of the present disclosure provide a method and an apparatus for resource sensing and selection in sidelink communication supporting DRX operations.

According to an embodiment of the present disclosure, a method for operating a first terminal is provided. The method includes performing a resource sensing operation in consideration of a discontinuous reception (DRX) cycle of a second terminal performing a DRX operation. The method also includes performing a resource selection operation based on a result of the resource sensing operation in an on-duration period within the DRX cycle. The method additionally includes performing sidelink communication with the second terminal using transmission resources selected by the resource selection operation.

In an aspect, the on-duration period of the second terminal existing after an end time of a resource sensing window in which the resource sensing operation is performed may be configured as a resource selection window in which the resource selection operation is performed.

In an aspect, when a start time of the resource sensing window is before a time obtained by subtracting a length of the resource sensing window from a start time of the resource selection window, the resource sensing operation may be additionally performed during a period from the end time of the resource sensing window to the start time of the resource selection window.

In an aspect, the resource sensing operation may be performed in one or more on-duration periods configured in the second terminal. A length of the one or more on-duration periods may not exceed a length of a resource sensing window configured for the resource sensing operation.

In an aspect, a resource sensing window in which the resource sensing operation is performed may include n on-duration periods configured in the second terminal. The resource sensing operation may be performed in the n on-duration periods, and n may be a natural number.

In an aspect, performing the resource sensing operation may include performing the resource sensing operation in a first resource sensing window. Performing the resource sensing operation may also include re-performing the resource sensing operation after the first resource sensing window when a degree of congestion in the first resource sensing window is greater than or equal to a threshold.

In an aspect, re-performing the resource sensing operation may be performed by a maximum number of retransmissions, and the maximum number of retransmissions may be set by higher-layer signaling.

In an aspect, when a degree of congestion is less than a threshold in a resource sensing window in which the resource sensing operation is performed, the resource selection operation may be performed after the resource sensing operation.

According to another embodiment of the present disclosure, another method for operation of a first terminal is provided and may include performing a resource sensing operation in consideration of a discontinuous reception (DRX) cycle of the first terminal performing a DRX operation. The method may also include performing a resource selection operation based on a result of the resource sensing operation in an on-duration period within the DRX cycle. The method may additionally include performing sidelink communication with a second terminal using transmission resources selected by the resource selection operation.

In an aspect, the resource sensing operation may be performed in one or more on-duration periods configured in the first terminal. A length of the one or more on-duration periods may not exceed a resource sensing window configured for the resource sensing operation.

In an aspect, a resource sensing window in which the resource sensing operation is performed may include n on-duration periods configured in the second terminal. The resource sensing operation may be performed in the n on-duration periods. In an aspect, n may be a natural number.

In an aspect, performing the resource sensing operation may include performing the resource sensing operation in a first resource sensing window. Performing the resource sensing operation may also include re-performing the resource sensing operation after the first resource sensing window when a degree of congestion in the first resource sensing window is greater than or equal to a threshold.

In an aspect, re-performing the resource sensing operation may be performed by a maximum number of retransmissions. The threshold may be changed according to a number of times the resource sensing operation is re-performed.

In an aspect, the resource sensing operation may be stopped in a specific time period before re-performing the resource sensing operation, and the specific time period may be configured to be associated with the DRX cycle.

According to still another embodiment of the present disclosure, yet another method for operating a first terminal is provided and may include performing a resource sensing operation in consideration of a discontinuous reception (DRX) cycle of the first terminal performing a DRX operation. The method may also include performing a resource selection operation based on a result of the resource sensing operation in an overlapping period between an on-duration period configured in the first terminal and an on-duration period configured in a second terminal. The method may additionally include performing sidelink communication with the second terminal using transmission resources selected by the resource selection operation.

In an aspect, the first terminal may perform a function of a transmitting terminal in sidelink communication with the second terminal. The first terminal may perform a function of a receiving terminal based on DRX configuration information in sidelink communication with a third terminal.

In an aspect, the resource sensing operation may be performed in a resource sensing window configured for the first terminal. The resource sensing operation may further be performed during a period from an end time of the resource sensing window to a start time of the overlapping period.

In an aspect, performing the resource sensing operation may include performing the resource sensing operation in a first resource sensing window. Performing the resource sensing operation may also include re-performing the resource sensing operation after the first resource sensing window when a degree of congestion in the first resource sensing window is greater than or equal to a threshold.

In an aspect, re-performing the resource sensing operation may be performed by a maximum number of retransmissions. The maximum number of retransmissions may be set by higher-layer signaling. The threshold may be changed according to a number of times the resource sensing operation is re-performed.

In an aspect, the resource sensing operation may be stopped in a specific time period before re-performing the resource sensing operation, and the specific time period may be configured to be associated with the DRX cycle.

According to embodiments of the present disclosure, a first terminal (e.g., transmitting terminal) may perform a resource sensing operation in consideration of a DRX cycle configured in the first terminal or a DRX cycle configured in a second terminal. The first terminal may perform a resource selection operation based on a result of the resource sensing operation in an on-duration period according to the DRX cycle. The first terminal may perform sidelink communication with the second terminal using transmission resources selected by the resource selection operation. Accordingly, the resource sensing/selection operations can be efficiently performed in sidelink communication supporting DRX operations, and the performance of the communication system can be improved.

BRIEF DESCRIPTION OF THE DRAWINGS

The above and other objects, features and advantages of the present disclosure should be more apparent from the following detailed description taken in conjunction with the accompanying drawings, in which:

FIG. 10 is a conceptual diagram illustrating another embodiment of sidelink communication supporting DRX operations.

FIG. 11 is a conceptual diagram illustrating DRX operation modes applicable to sidelink communication, according to one embodiment.

DETAILED DESCRIPTION

Figure 1:
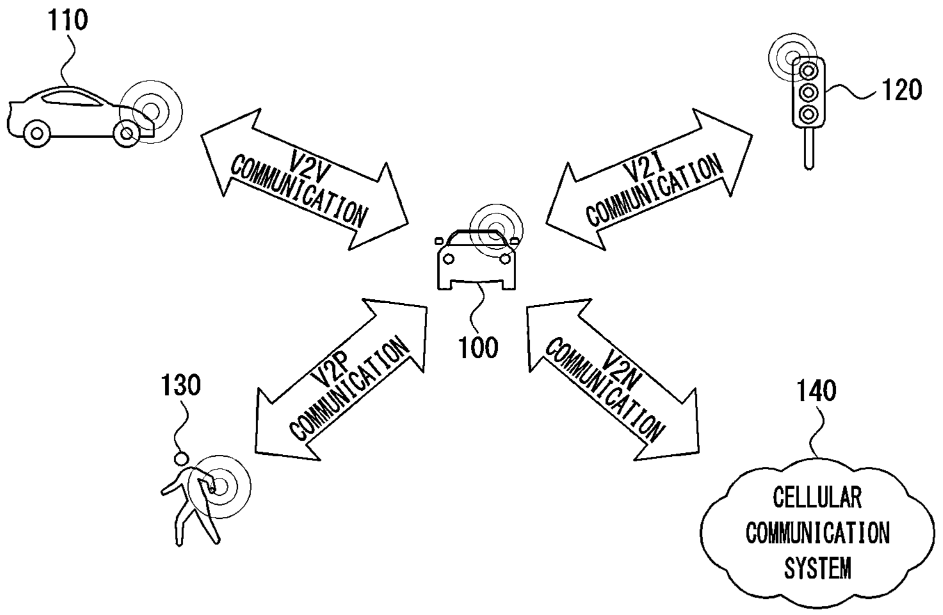
FIG. 1 is a conceptual diagram illustrating V2X communication scenarios, according to one embodiment.

Hereinafter, embodiments of the present disclosure are described in detail with reference to the accompanying drawings. It should be understood, however, that the embodiments described in the present disclosure are not intended to limit the scope of the technical concepts of the present disclosure. On the contrary, the present disclosure is intended to cover various modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B."

In embodiments of the present disclosure, "(re)transmission" may refer to "transmission," "retransmission," or "transmission and retransmission." Further, "(re)configuration" may refer to "configuration," "reconfiguration," or "configuration and reconfiguration." Additionally, "(re)connection" may refer to "connection," "reconnection," or "connection and reconnection." Further, "(re)access" may refer to "access," "re-access," or "access and re-access."

When it is stated that a certain component is "coupled with" or "connected with" another component, it should be understood that the certain component is directly "coupled with" or "connected with" to the other component or a further component may be disposed therebetween. In contrast, when it is stated that a certain component is "directly coupled with" or "directly connected with" another component, it should be understood that a further component is not disposed therebetween.

The terms used in the present disclosure are only used to describe specific embodiments and are not intended to limit the present disclosure. The singular expression includes the plural expression unless the context clearly dictates otherwise. In the present disclosure, terms such as "comprise" or "have" are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

When a component, device, element, or the like of the present disclosure is described as having a purpose or performing an operation, function, or the like, the component, device, or element should be considered herein as being "configured to" meet that purpose or perform that operation or function.

Hereinafter, embodiments of the present disclosure are described in detail with reference to the accompanying drawings. In the following description, to facilitate the entire understanding of the disclosure, like numbers refer to like elements throughout the description of the figures and the repetitive description thereof has been omitted.

FIG. 1 is a conceptual diagram illustrating V2X communication scenarios, according to one embodiment.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140). The V2X communications supported by the cellular communication system 140 may be referred to as "Cellular-V2X (C-V2X) communications." The cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the first vehicle 100) and a second vehicle 110 (e.g., a communication node located in the second vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported in the cellular communication system 140 may be performed based on "sidelink" communication technologies (e.g., ProSe and D2D communication technologies, and the like). In this case, the communications between the vehicles 100 and 110 may be performed using at least one sidelink channel established between the vehicles 100 and 110.

The V2I communications may include communications between the first vehicle 100 (e.g., the communication node located in the first vehicle 100) and an infrastructure (e.g., road side unit (RSU)) 120 located on a roadside. The infrastructure 120 may also include a traffic light or a street light located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., ProSe and D2D communication technologies, and the like). In this case, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the first vehicle 100) and a person 130 (e.g., a communication node carried by the person 130). The driving information of the first vehicle 100 and movement information of the person 130 such as velocity, heading, time, position, and the like may be exchanged between the first vehicle 100 and the person 130 through the V2P communications. The communication node located in the first vehicle 100 or the communication node carried by the person 130 may generate an alarm indicating danger by determining a dangerous situation based on the obtained driving information and movement information. The V2P communications supported in the cellular communication system 140 may be performed based on sidelink communication technologies (e.g., ProSe and D2D communication technologies, and the like). In this case, the communications between the communication node located in the first vehicle 100 and the communication node carried by the person 130 may be performed using at least one sidelink channel established between the communication nodes.

The V2N communications may be communications between the first vehicle 100 (e.g., the communication node located in the first vehicle 100) and a server connected through the cellular communication system 140. The V2N communications may be performed based on the 4G communication technology (e.g., LTE or LTE-A) and/or the 5G communication technology (e.g., NR). Additionally or alternatively, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, and/or a Wireless Personal Area Network (WPAN) communication technology defined in IEEE 802.15.

The cellular communication system 140 supporting the V2X communications, according to an embodiment, may be configured as follows.

Figure 2:
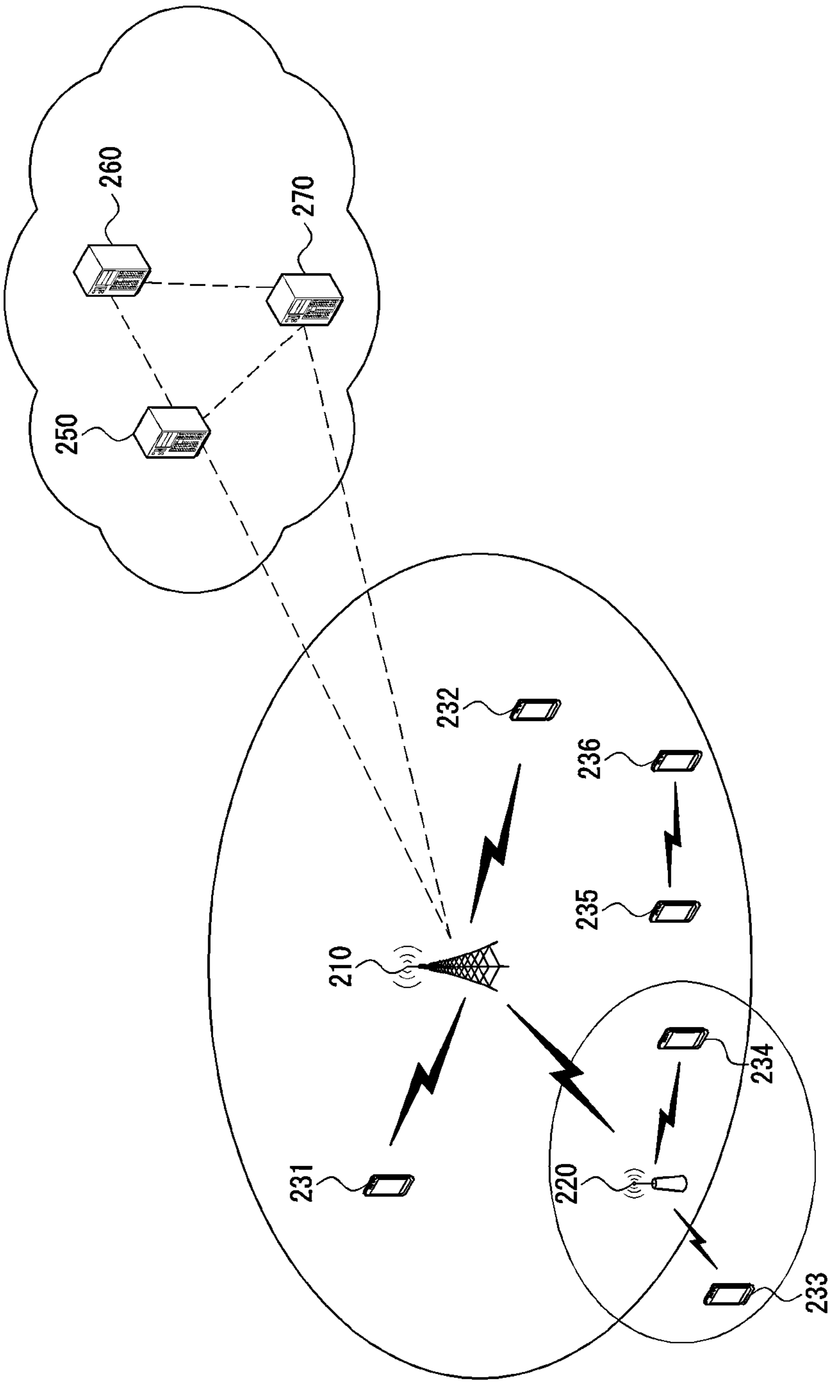
FIG. 2 is a conceptual diagram illustrating an embodiment of a cellular communication system.

FIG. 2 is a conceptual diagram illustrating an embodiment of a cellular communication system.

As shown in FIG. 2, a cellular communication system may include an access network, a core network, and the like. The access network may include a base station 210, a relay 220, User Equipments (UEs) 231-236, and the like. The UEs 231-236 may include communication nodes located in the vehicles 100 and 110 of FIG. 1, the communication node located in the infrastructure 120 of FIG. 1, the communication node carried by the person 130 of FIG. 1, and the like. In an embodiment in which the cellular communication system supports the 4G communication technology, the core network may include a serving gateway (S-GW) 250, a packet data network (PDN) gateway (P-GW) 260, a mobility management entity (MME) 270, and the like.

In an embodiment in which the cellular communication system supports the 5G communication technology, the core network may include a user plane function (UPF) 250, a session management function (SMF) 260, an access and mobility management function (AMF) 270, and the like. Alternatively, in an embodiment in which the cellular communication system operates in a Non-Stand Alone (NSA) mode, the core network constituted by the S-GW 250, the P-GW 260, and the MME 270 may support the 5G communication technology as well as the 4G communication technology, and the core network constituted by the UPF 250, the SMF 260, and the AMF 270 may support the 4G communication technology as well as the 5G communication technology.

In addition, in an embodiment in which the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) including the cellular communication system may perform communications by using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) including the cellular communication system, in various embodiments, may be configured as follows.

Figure 3:
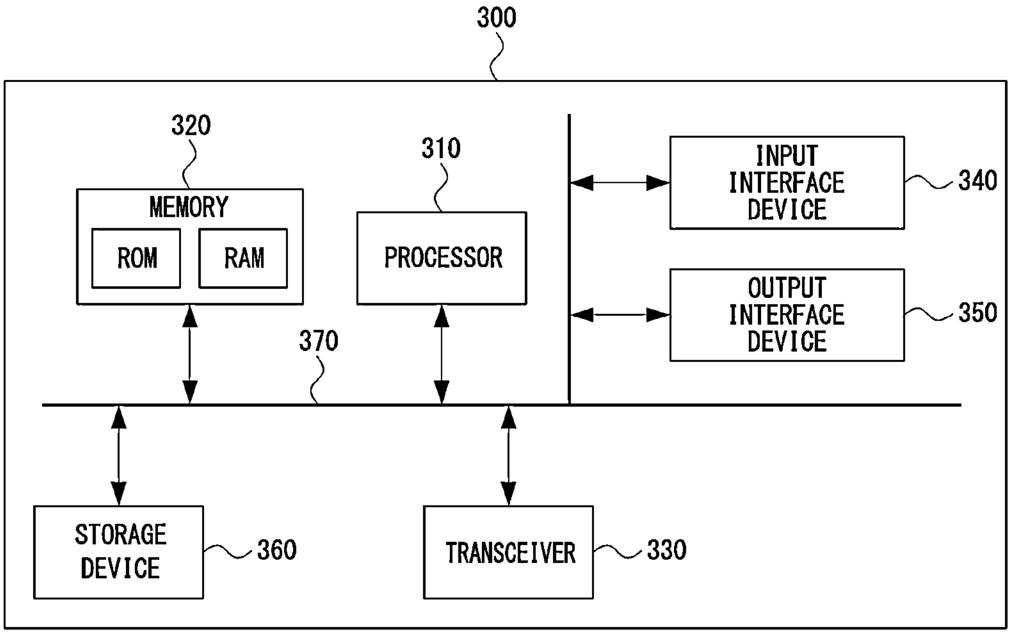
FIG. 3 is a conceptual diagram illustrating an embodiment of a communication node constituting a cellular communication system.

FIG. 3 is a conceptual diagram illustrating an embodiment of a communication node of a cellular communication system.

As shown in FIG. 3, a communication node 300 may include at least one processor 310, a memory 320, and/or a transceiver 330 connected to a network for performing communications. The communication node 300 may further include an input interface device 340, an output interface device 350, a storage device 360, and the like. Each component included in the communication node 300 may be connected to a bus 370. The components included in the communication node 300 may communicate with each other via the bus 370.

Additionally or alternatively, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, or the storage device 360 via a dedicated interface.

The processor 310 may execute at least one instruction stored in at least one of the memory 320 or the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium or a non-volatile storage medium. For example, the memory 320 may include at least one of a read-only memory (ROM) or a random access memory (RAM).

Referring again to FIG. 2, in the communication system, the base station 210 may form a macro cell or a small cell and may be connected to the core network via an ideal backhaul or a non-ideal backhaul. The base station 210 may transmit signals received from the core network to the UEs 231-236 and the relay 220. The base station 210 may also transmit signals received from the UEs 231-236 and the relay 220 to the core network. The UEs 231, 232, 234, 235, and 236 may belong to cell coverage of the base station 210. The UEs 231, 232, 234, 235, and 236 may connect to the base station 210 by performing a connection establishment procedure with the base station 210. The UEs 231, 232, 234, 235, and 236 may communicate with the base station 210 after being connected to the base station 210.

The relay 220 may be connected to the base station 210 and may relay communications between the base station 210 and the UEs 233 and 234. For example, the relay 220 may transmit signals received from the base station 210 to the UEs 233 and 234. The relay 220 may also transmit signals received from the UEs 233 and 234 to the base station 210. The UE 234 may belong to both of the cell coverage of the base station 210 and the cell coverage of the relay 220. The UE 233 may belong to the cell coverage of the relay 220. The UE 233 may be located outside the cell coverage of the base station 210. The UEs 233 and 234 may connect to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), and/or the like. The UEs 231, 232, 235, and 236 may perform operations corresponding to the base station 210 and operations supported by the base station 210. The UEs 233 and 234 may perform operations corresponding to the relay 220 and operations supported by the relay 220.

The base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231-236 may be referred to as a terminal, an access terminal, a mobile terminal, a station, a subscriber station, a mobile station, a portable subscriber station, a node, a device, an on-broad unit (OBU), or the like.

The communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
|---|---|---|
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

A user plane protocol stack of the UEs (e.g., the UEs 235 and 236) performing sidelink communications, according to an embodiment, may be configured as follows.

Figure 4:
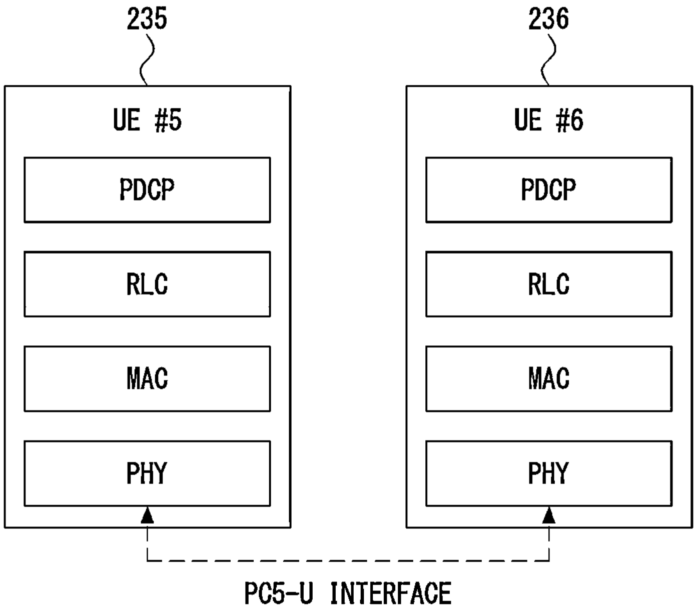
FIG. 4 is a block diagram illustrating an embodiment of a user plane protocol stack of a UE performing sidelink communication.

FIG. 4 is a block diagram illustrating an embodiment of a user plane protocol stack of a UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A-D of Table 1. The user plane protocol stack of each of the UEs 235 and 236 may include a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications. The layer-2 ID may be an ID configured for the V2X communications (e.g., V2X service). Also, in the sidelink communications, a hybrid automatic repeat request (HARQ) feedback operation may be supported, and an RLC acknowledged mode (RLC AM) or an RLC unacknowledged mode (RLC UM) may be supported.

A control plane protocol stack of the UEs (e.g., the UEs 235 and 236) performing sidelink communications, according to an embodiment, may be configured as follows.

Figure 5:
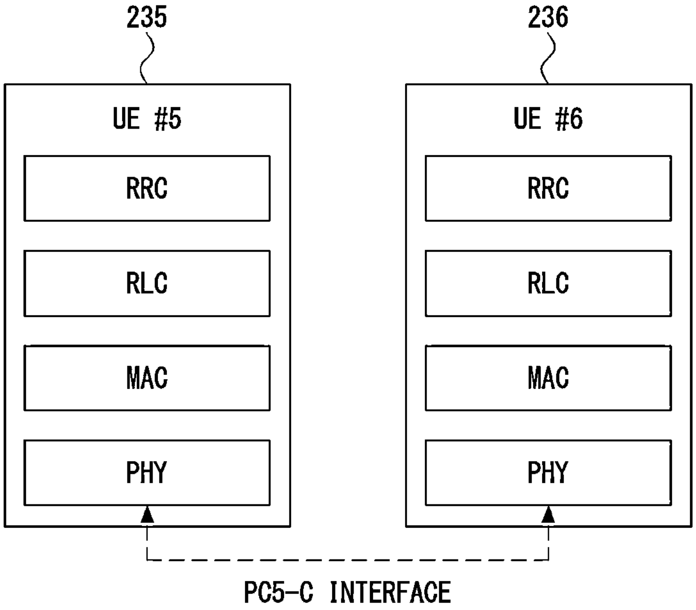
FIG. 5 is a block diagram illustrating an embodiment of a control plane protocol stack of a UE performing sidelink communication.
Figure 6:
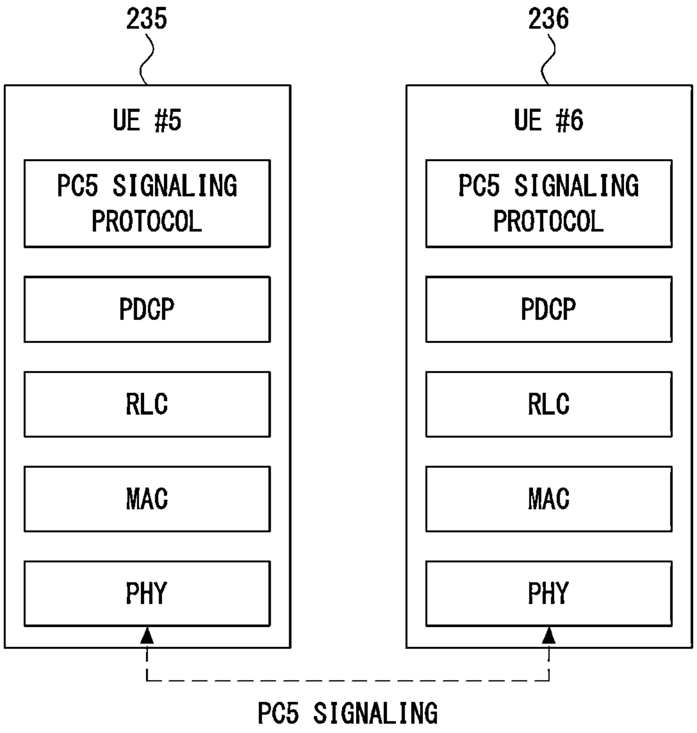
FIG. 6 is a block diagram illustrating another embodiment of a control plane protocol stack of a UE performing sidelink communication.

FIG. 5 is a block diagram illustrating a first embodiment of a control plane protocol stack of a UE performing sidelink communication. FIG. 6 is a block diagram illustrating a second embodiment of a control plane protocol stack of a UE performing sidelink communication.

As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A-D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). A demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

A sidelink transmission mode (TM) may be classified into sidelink TMs 1-4 as shown below in Table 2.

TABLE 2

| Sidelink TM | Description |
|---|---|
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

In an embodiment in which the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. In an embodiment in which the sidelink TM 3 is supported, the resource pool used for transmission of the sidelink control information may be configured by a dedicated RRC signaling procedure. In this case, the sidelink control information may be transmitted through resources scheduled by the base station 210 within the resource pool configured by the dedicated RRC signaling procedure. In an embodiment in which the sidelink TM 4 is supported, the resource pool used for transmission of the sidelink control information may be configured by a dedicated RRC signaling procedure or a broadcast RRC signaling procedure. In this case, the sidelink control information may be transmitted through resources selected autonomously by the UE (e.g., UE 235 or 236) within the resource pool configured by the dedicated RRC signaling procedure or the broadcast RRC signaling procedure.

In an embodiment in which the sidelink TM 3 is supported, the resource pool for transmitting and receiving sidelink data may not be configured. In this case, the sidelink data may be transmitted and received through resources scheduled by the base station 210. In an embodiment in which the sidelink TM 4 is supported, the resource pool for transmitting and receiving sidelink data may be configured by a dedicated RRC signaling procedure or a broadcast RRC signaling procedure. In this case, the sidelink data may be transmitted and received through resources selected autonomously by the UE (e.g., UE 235 or 236) within the resource pool configured by the dedicated RRC signaling procedure or the broadcast RRC signaling procedure.

Hereinafter, sidelink communication methods, according to various embodiments, are described. When a method (e.g., transmission or reception of a signal) to be performed at a first communication node among communication nodes is described, a corresponding second communication node may perform a method (e.g., reception or transmission of the signal) corresponding to the method performed at the first communication node. For example, when an operation of a UE #1 (e.g., vehicle #1) is described, a UE #2 (e.g., vehicle #2) corresponding thereto may perform an operation corresponding to the operation of the UE #1. Conversely, when an operation of the UE #2 is described, the corresponding UE #1 may perform an operation corresponding to the operation of the UE #2. In embodiments described below, an operation of a vehicle may be an operation of a communication node located in the vehicle.

In embodiments, signaling may be one of, or a combination of two or more of, higher layer signaling, MAC signaling, and physical (PHY) signaling. A message used for higher layer signaling may be referred to as a "higher layer message" or "higher layer signaling message." A message used for MAC signaling may be referred to as a "MAC message" or "MAC signaling message." A message used for PHY signaling may be referred to as a "PHY message" or "PHY signaling message." The higher layer signaling may refer to an operation of transmitting and receiving system information (e.g., master information block (MIB), system information block (SIB)) and/or an RRC message. The MAC signaling may refer to an operation of transmitting and receiving a MAC control element (CE). The PHY signaling may refer to an operation of transmitting and receiving control information (e.g., downlink control information (DCI), uplink control information (UCI), or SCI).

A sidelink signal may be a synchronization signal and a reference signal used for sidelink communication. For example, the synchronization signal may be a synchronization signal/physical broadcast channel (SS/PBCH) block, sidelink synchronization signal (SLSS), primary sidelink synchronization signal (PSSS), secondary sidelink synchronization signal (SSSS), or the like. The reference signal may be a channel state information-reference signal (CSI-RS), DM-RS, phase tracking-reference signal (PT-RS), cell-specific reference signal (CRS), sounding reference signal (SRS), discovery reference signal (DRS), or the like.

A sidelink channel may be a PSSCH, PSCCH, PSDCH, PSBCH, physical sidelink feedback channel (PSFCH), or the like. In addition, a sidelink channel may refer to a sidelink channel including a sidelink signal mapped to specific resources in the corresponding sidelink channel. The sidelink communication may support a broadcast service, a multicast service, a groupcast service, and a unicast service.

The sidelink communication may be performed based on a single-SCI scheme or a multi-SCI scheme. When the single-SCI scheme is used, data transmission (e.g., sidelink data transmission, sidelink-shared channel (SL-SCH) transmission) may be performed based on one SCI (e.g., 1st-stage SCI). When the multi-SCI scheme is used, data transmission may be performed using two SCIs (e.g., 1st-stage SCI and 2nd-stage SCI). The SCI(s) may be transmitted on a PSCCH and/or a PSSCH. When the single-SCI scheme is used, the SCI (e.g., 1st-stage SCI) may be transmitted on a PSCCH. When the multi-SCI scheme is used, the 1st-stage SCI may be transmitted on a PSCCH, and the 2nd-stage SCI may be transmitted on the PSCCH or a PSSCH. The 1st-stage SCI may be referred to as 'first-stage SCI', and the 2nd-stage SCI may be referred to as 'second-stage SCI'. A format of the first-stage SCI may include a SCI format 1-A, and a format of the second-stage SCI may include a SCI format 2-A and a SCI format 2-B.

The 1st-stage SCI may include or more information elements among priority information, frequency resource assignment information, time resource assignment information, resource reservation period information, demodulation reference signal (DMRS) pattern information, 2nd-stage SCI format information, a beta_offset indicator, the number of DMRS ports, and modulation and coding scheme (MCS) information. The 2nd-stage SCI may include one or more information elements among a HARQ processor identifier (ID), a redundancy version (RV), a source ID, a destination ID, CSI request information, a zone ID, and communication range requirements.

In embodiments, "configuring an operation (e.g., DRX operation)" may refer to signaling of configuration information (e.g., information elements, parameters) for the operation and/or information instructing to perform the operation. "Configuring an information element (e.g., parameter)" may mean that the information element is signaled. The signaling may be at least one of system information (SI) signaling (e.g., transmission of a system information block (SIB) and/or master information block (MIB)), RRC signaling (e.g., transmission of an RRC parameter and/or higher layer parameter), MAC control element (CE) signaling, or PHY signaling (e.g., transmission of downlink control information (DCI), uplink control information (UCI), and/or sidelink control information (SCI)). The MAC CE signaling operation may be performed through a data channel, the PHY signaling operation may be performed through a control channel or a data channel, and transmission of SCI may refer to transmission of first-stage SCI and/or second-stage SCI.

Sidelink communication may support a DRX operation. A resource sensing/selection operation may be performed in association with the DRX operation (e.g., DRX cycle). In embodiments, a resource sensing/selection operation may refer to "resource sensing operation," "resource selection operation," or "resource sensing operation and resource selection operation." The DRX operation may be configured in consideration of the resource sensing/selection operation (e.g., resource sensing/selection period). In embodiments, a resource sensing/selection period may refer to "resource sensing period," "resource selection period," or "resource sensing period and resource selection period." The resource sensing period may mean a resource sensing window. The resource selection period may mean a resource selection window. The DRX operation may be applied to a transmitting terminal, a receiving terminal, or both a transmitting terminal and a receiving terminal. In embodiments, a transmitting terminal may mean a terminal transmitting data (e.g., sidelink (SL) data), and a receiving terminal may mean a terminal receiving the data (e.g., SL data).

When a DRX operation is used, a receiving terminal may operate according to a DRX cycle. The DRX cycle may include an on-duration and an off-duration. In embodiments, an on-duration may be referred to as an on-duration period, and an off-duration may be referred to as an off-duration period. The receiving terminal may operate in an ON state (e.g., wake-up state) in an on-duration period within the DRX cycle. Accordingly, the receiving terminal may perform a reception operation and/or a transmission operation in the on-duration period. The receiving terminal may operate in an OFF state (e.g., sleep state, idle state, or inactive state) in an off-duration period within the DRX cycle. Accordingly, the receiving terminal may not perform a reception operation and/or a transmission operation in the off-duration period.

DRX configuration information may include information on the DRX cycle, information on the on-duration, and/or information on the off-duration. The DRX configuration information may be signaled from a communication node (e.g., base station and/or transmitting terminal) to the transmitting terminal and/or receiving terminal. The transmitting terminal may attempt data transmission in an on-duration period based on the DRX configuration information configured in the receiving terminal(s). The data transmission may be performed based on a unicast scheme, groupcast scheme, multicast scheme, or broadcast scheme. When the groupcast scheme is used, the transmitting terminal may attempt data transmission in an on-duration period based on the DRX configuration information configured in a group including one or more receiving terminals.

A terminal may support communication on a plurality of links. The terminal may perform a function of a receiving terminal on one or more links among the plurality of links. In this case, the terminal may attempt data reception in an on-duration period based on DRX configuration information configured for the receiving terminal. The terminal may operate in the ON state in an on-duration period according to the DRX configuration information. Accordingly, when the terminal performs a function of a transmitting terminal on another link, the terminal may perform a transmission operation and/or a reception operation based on the DRX configuration information.

That a terminal (e.g., transmitting terminal) performs a transmission operation and/or reception operation in an on-duration period according to DRX configuration may be referred to as "per-direction discontinuous transmission or reception (DTRX) operation." A terminal (e.g., receiving terminal) performing a reception operation in an on-duration period according to DRX configuration information may be referred to as "per-direction DRX operation." A per-direction DTRX operation and a per-direction DRX operation being simultaneously performed on one link may be referred to as "both-direction (bi-directional) DTRX operation." The same DRX configuration information may be applied to links on which the DRX operations are performed. When a transmitting terminal and a receiving terminal have different DRX configuration information, a per-direction DTRX operation and a per-direction DRX operation may be performed.

Figure 7:
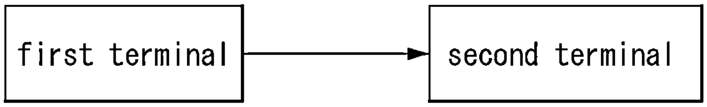
FIG. 7 is a conceptual diagram illustrating an embodiment of sidelink communication supporting DRX operations.

FIG. 7 is a conceptual diagram illustrating a first embodiment of sidelink communication supporting DRX operations.

As shown in FIG. 7, a first terminal may be a transmitting terminal in sidelink communication and a second terminal may be a receiving terminal in the sidelink communication. When the second terminal performs a DRX operation, data to be transmitted to the second terminal occurs in the first terminal, and a resource sensing/selection operation needs to be performed, the first terminal may operate as follows.

[Resource Sensing/Selection Operation of First Terminal Supporting Per-Direction DRX Operation]

In a per-direction DRX operation, the second terminal (e.g., receiving terminal) may perform a reception operation in an on-duration period based on DRX configuration information of the second terminal. Accordingly, the first terminal (e.g., transmitting terminal) may perform a per-direction DRX operation and/or a resource sensing/selection operation in consideration of the DRX configuration information of the second terminal.

Embodiment 1: A Start Time of a Resource Sensing Operation (e.g., Initial Resource Sensing Operation) of the First Terminal May be Configured Independently of the DRX Operation of the Second Terminal When the second terminal performs the DRX operation and the first terminal performs an initial resource sensing operation, a start time of the initial resource sensing operation may be configured independently of the DRX operation. The first terminal may perform the resource sensing operation based on resource sensing configuration information independently of a DRX cycle configured in the second terminal. The resource sensing configuration information may be preconfigured from a base station to the first terminal Thereafter, the first terminal may perform a resource selection operation in an on-duration period of the second terminal based on a result of the resource sensing operation. The first terminal may transmit data using resources selected by the resource selection operation. In embodiments, an on-duration period of the first terminal may be an on-duration period configured for the first terminal (e.g., on-duration period according to DRX configuration information for the first terminal) and an on-duration of the second terminal may be an on-duration period configured for the second terminal (e.g., on-duration period according to DRX configuration information for the second terminal).

The resource selection operation may be performed based on resource selection configuration information. The resource sensing configuration information and/or resource selection configuration information may be configured in consideration of the DRX operation. For example, the base station may generate the resource sensing configuration information and/or resource selection configuration information in consideration of the DRX operation. The base station may signal the resource sensing configuration information and/or resource selection configuration information to a communication node (e.g., first terminal and/or second terminal).

The resource sensing/selection operation of the first terminal may be performed based on method(s) below. The first terminal may perform a resource selection operation based on a result of the resource sensing operation in the earliest on-duration period among on-duration periods of the second terminal. The above-described operation may be performed with priority. When an on-duration period of the second terminal does not exist within a resource selection window, at least one of Method 1 or Method 2 below may be performed.

Method 1: When an on-duration period of the second terminal does not exist within the resource selection window, the first terminal may stop the resource selection operation until a start time of an on-duration period of the second terminal. The first terminal may configure on-duration period(s) of the second terminal as a resource selection window, and may perform a resource selection operation within the configured resource selection window.

Method 2: When an on-duration period of the second terminal does not exist within the resource selection window, the first terminal may extend the resource sensing window until a start time of an on-duration period of the second terminal and may perform a resource sensing operation within the extended resource sensing window. Thereafter, the first terminal may configure on-duration period(s) of the second terminal as a resource selection window and may perform a resource selection operation within the configured resource selection window.

A combined from of Method 1 and Method 2 may be used. Alternatively, a method extended based on Method 1 and/or a method extended based on Method 2 may be used. When the first terminal performs a function of a receiving terminal on another link, application of Method 2 may not be possible due to operations of the first terminal on the other link. In this case, Method 1 may be applied. One of Method 1 and/or Method 2 may be performed depending on configuration of the communication system. The first terminal may selectively perform Method 1 or Method 2 according to a communication environment.

When the first terminal fails to select a resource in the earliest on-duration period of the second terminal, one of Methods 3-8 below may be performed.

Method 3: The first terminal may (re-)perform the resource sensing operation from an end time of an on-duration period (e.g., the earliest on-duration period) of the second terminal. In this case, the first terminal may configure a resource sensing window as a period until a start time of the next on-duration period of the second terminal and may perform the resource sensing operation within the configured resource sensing window. Thereafter, the first terminal may configure on-duration period(s) after the resource sensing operation (e.g., resource sensing window) as a resource selection window and may perform a resource selection operation within the configured resource selection window.

Method 4: The first terminal may configure a resource sensing window as a period from an end time of an on-duration period (e.g., the earliest on-duration period) of the second terminal to a start time of an on-duration period of the second terminal, which occurs after n on-duration periods from the end time. In an example, n may be a natural number. The first terminal may perform a resource sensing operation within the configured resource sensing window. Thereafter, the first terminal may configure on-duration period(s) after the resource sensing operation (e.g., resource sensing window) as a resource selection window and may perform a resource selection operation within the configured resource selection window.

Method 5: The first terminal may (re-)perform a resource sensing operation in a portion or the entirety of an on-duration period (e.g., the earliest on-duration period) of the second terminal. In this case, the size of the resource sensing window may be maintained at a preconfigured size. The first terminal may perform a resource selection operation based on Method 1 or Method 2.

Method 6: The first terminal may (re-)perform a resource sensing operation in a portion or the entirety of an on-duration period (e.g., the earliest on-duration period) of the second terminal. In this case, the first terminal may configure a resource sensing window as a period until a start time of the next on-duration period of the second terminal and may perform the resource sensing operation within the configured resource sensing window. Thereafter, the first terminal may configure on-duration period(s) after the resource sensing operation (e.g., resource sensing window) as a resource selection window and may perform a resource selection operation within the configured resource selection window.

Method 7: The first terminal may (re-)perform a resource sensing operation in a portion or the entirety of an on-duration period (e.g., the earliest on-duration period) of the second terminal. In this case, the first terminal may configure a resource sensing window as a period from an end time of the on-duration period of the second terminal to a start time of an on-duration period occurring after n on-duration periods from the end time. In an example, n may be a natural number. The first terminal may perform a resource sensing operation within the configured resource sensing window. Thereafter, the first terminal may configure on-duration period(s) after the resource sensing operation (e.g., resource sensing window) as a resource selection window. The first terminal may perform a resource selection operation within the configured resource selection window.

Method 8: The first terminal may configure a portion or the entirety of an on-duration period (e.g., on-duration period for resource selection) of the second terminal as a resource sensing window. The first terminal may perform a resource sensing operation within the configured resource sensing window. Alternatively, the first terminal may perform a resource sensing operation based on resource sensing configuration information after an end time of the on-duration period of the second terminal. When the resource sensing operation is terminated, the first terminal may perform Method 1 or Method 2.

In Method 4 and/or Method 7, a result of the resource sensing operation performed before the start time of the on-duration period after n DRX cycles (e.g., n on-duration periods) may indicate that resource selection is possible in the on-duration period(s) of the second terminal. In this case, the first terminal may stop the resource sensing operation and perform a resource selection operation. When the resource sensing window includes on-duration period(s) and off-duration period(s) of the second terminal, Methods 1-8 may be performed. The communication node (e.g., the first terminal and/or the second terminal) may perform combined forms of the above methods and/or methods extended based on the above methods.

Embodiment 2: A Start Time of a Resource Sensing Operation (e.g., Initial Resource Sensing Operation) of the First Terminal May be Configured to be Associated with a DRX Operation of the Second Terminal When the second terminal performs a DRX operation and the first terminal performs an initial resource sensing operation, a start time of the initial resource sensing operation may be configured to be associated with the DRX operation. The first terminal may perform a resource sensing operation based on resource sensing configuration information in consideration of a DRX cycle configured in the second terminal. The resource sensing configuration information may be preconfigured from the base station to the first terminal. Thereafter, the first terminal may perform a resource selection operation within an on-duration period of the second terminal based on a result of the resource sensing operation. The first terminal may transmit data using transmission resources selected by the resource selection operation. The resource selection operation may be performed based on resource selection configuration information. The resource sensing configuration information and/or resource selection configuration information may be configured in consideration of the DRX operation. For example, the base station may generate the resource sensing configuration information and/or resource selection configuration information in consideration of the DRX operation, and may transmit the resource sensing configuration information and/or resource selection configuration information to the communication node (e.g., the first terminal and/or the second terminal).

The resource sensing/selection operation of the first terminal may be performed based on method(s) below. Based on a preconfigured resource sensing window, the first terminal may configure a start time of the resource sensing operation as a time before a start time of a specific on-duration period of the second terminal. Considering a resource sensing window after the resource sensing operation is determined to be performed, the specific on-duration period may be the earliest on-duration period of the second terminal. In this case, one of Methods 9-11 below may be performed.

Method 9: When the length of the resource sensing window is L, the first terminal may configure an on-duration period of the second terminal existing after a time corresponding to the length L from a current time as a resource selection window. When a start time of the resource selection window is T, the first terminal may perform a resource sensing operation from a time corresponding to (T−L) or a time before the time corresponding to (T−L). L may be in units of a symbol, mini-slot, slot, or millisecond. When the resource sensing operation of the first terminal is performed from the time before the time corresponding to (T−L), the first terminal may perform the resource sensing operation continuously (e.g., additionally) from an end time of the resource sensing operation (e.g., resource sensing window) to a start time of a resource selection window. Alternatively, the first terminal may not perform the resource sensing operation in a period from the end time of the resource sensing operation (e.g., resource sensing window) to the start time of the resource selection window and may perform a resource selection operation within the resource selection window.

Method 10: When the length of the resource sensing window is L, the first terminal may perform a resource sensing operation only in on-duration period(s) of the second terminal from a current time. The length of accumulated on-duration periods in which the resource sensing operation is performed may not exceed L. The first terminal may perform a resource selection operation within on-duration period(s) of the second terminal after completion of the resource sensing operation. L may be in units of a symbol, mini-slot, slot, or millisecond. When the length of (n on-duration periods (e.g., on-durations #1 to #n)+a portion of an on-duration #n+1) is L, the first terminal may stop the resource sensing operation at an end time of the portion of the on-duration #n+1. Thereafter, the first terminal may perform a resource selection operation. Accordingly, the first terminal may perform the resource selection operation after the portion of the on-duration #n+1. Alternatively, the first terminal may perform the resource sensing operation in the on-duration #n+1 and may perform a resource selection operation in on-duration(s) after the on-duration #n+1. Alternatively, the first terminal may stop the resource sensing operation at the end time of the portion of the on-duration #n+1. The first terminal may perform a resource selection operation in on-duration(s) after the on-duration #n+1. In an example, n may be a natural number.

Method 11: The resource sensing window may be configured as n on-duration periods. In an example, n may be a natural number. The n on-duration periods may be on-duration periods of the second terminal. The first terminal may perform a resource sensing operation in the n on-duration periods of the second terminal from on a current time. The number of accumulated on-duration periods in which the resource sensing operation is performed may not exceed n. The first terminal may perform a resource selection operation in on-duration period(s) of the second terminal after completion of the resource sensing operation. When the resource sensing window is configured as n on-duration periods, the resource sensing operation may be performed in consecutive n on-duration periods (e.g., on-duration #1 to #n). The first terminal may perform a resource selection operation in the on-duration #n+1 after the n consecutive on-duration periods (e.g., on-durations #1 to #n).

In Method 9, the resource sensing window may include on-duration period(s) and off-duration period(s) of the second terminal. In Methods 10 and 11, the resource sensing window may include only on-duration period(s) of the second terminal. Methods extended based on the above methods and/or combined forms of the above methods may be used.

Embodiment 3: Resource Sensing/Selection Operation Considering Congestion in Sidelink Communication Supporting DRX Operations The first terminal (e.g., transmitting terminal) may perform a resource sensing operation within a resource sensing window. When a degree of congestion is greater than or equal to a threshold in the resource sensing window, the first terminal may continue performing the resource sensing operation without performing a resource selection operation. Accordingly, the resource sensing operation may be re-performed. The degree of congestion may be determined based on a result of the resource sensing operation. The degree of congestion may be determined based on a channel busy ratio (CBR) and/or channel occupancy ratio (CR). A communication node (e.g., base station and/or another transmitting terminal) may signal the threshold, which is a criterion for determining the degree of congestion, to the first terminal. The above threshold may be signaled using at least one of system information, RRC message, MAC CE, or control information (e.g., DCI, SCI). The resource sensing operation may be re-performed as follows.

In the above-described embodiment 1, when the degree of congestion is equal to or greater than the threshold (e.g., when resource selection is impossible), the resource sensing operation in Methods 3, 4, and 8 may be re-performed from the end time of the on-duration period. In Methods 5-8, the resource sensing operation may be re-performed in a portion or the entirety of the on-duration period.

In the above-described embodiment 2, when the degree of congestion is greater than or equal to the threshold (e.g., when resource selection is impossible), in Methods 9 and 10, the resource sensing operation may be performed in a resource sensing window having a length L, and then the resource sensing operation may be re-performed. In Method 11, the resource sensing operation may be performed in a resource sensing window including n on-duration periods, and then the resource sensing operation may be re-performed.

When the degree of congestion is less than the threshold, the first terminal may terminate the resource sensing operation and may perform a resource selection operation in the earliest on-duration period of the second terminal. In the above-described embodiments, at least one of Methods 12-14 below may be used.

Method 12: The first terminal may stop the resource sensing operation in a specific time period before re-performing the resource sensing operation. The first terminal may perform the resource sensing operation after the specific time period. The specific time period may be configured to be associated with the DRX cycle.

Method 13: The number of times the resource sensing operation is re-performed may be limited. When the maximum number of re-performing the resource sensing operation is set to 3, the first terminal may continuously perform two resource sensing operations after performing the initial resource sensing operation. Thereafter, the first terminal may stop the resource sensing operation. In addition, the resource selection operation may be stopped.

Method 14: The threshold, which is a criterion for determining the degree of congestion, may be configured to change according to the number of times the resource sensing operation is re-performed. For example, the threshold may decrease as the number of re-performing the resource sensing operation increases. Alternatively, the threshold may increase as the number of re-performing the resource sensing operation increases.

A communication node (e.g., base station and/or another transmitting terminal) may transmit the above-described parameter(s) (e.g., threshold that is the criterion for the degree of congestion, specific time period, and/or maximum number of re-performing the resource sensing operation) to the first terminal using at least one of system information, RRC message, MAC CE, or control information (e.g., DCI, SCI). Methods extended based on the above methods and/or combined forms of the above methods may be used.

[Resource Sensing/Selection Operation of First Terminal Supporting Per-Direction DTRX Operations]

The first terminal (e.g., transmitting terminal) may support a plurality of links. The first terminal may perform a function of a receiving terminal on one or more links among the plurality of links. In this case, the first terminal may perform a reception operation based on DRX configuration information configured for a receiving terminal. The first terminal may operate in a wakeup state in an on-duration period according to the DRX configuration information. Accordingly, when the first terminal performs a function of a transmitting terminal on another link, the first terminal may perform a transmission operation or a reception operation according to DRX configuration information. When a per-direction DTRX operation is supported, the first terminal may operate in a wakeup state in an on-duration period according to the DRX configuration information. The first terminal may perform a transmission operation or a reception operation in the corresponding on-duration period. Accordingly, the first terminal may perform a resource sensing/selection operation in the on-duration period.

Embodiment 4

When the first terminal performs a per-direction DTRX operation and data to be transmitted to the second terminal occurs in the first terminal, the first terminal may determine candidate resources by performing a resource sensing operation. The first terminal may select transmission resources from among the candidate resources by performing a resource selection operation and transmit data to the second terminal using the transmission resources. The first terminal may perform a resource sensing operation based on resource sensing configuration information in an on-duration period configured for the first terminal. When the resource sensing operation is completed, the first terminal may perform a resource selection operation in on-duration period(s) of the first terminal. The resource sensing configuration information and/or resource selection configuration information for the first terminal may be configured in consideration of the DRX operation (e.g., per-direction DTRX operation).

In the embodiment 4, the first terminal may perform the resource sensing/selection operation based on method(s) below. A start time of a resource sensing window of the first terminal may be configured to be the same as a start time of an on-duration period of the first terminal. The on-duration period in which the resource sensing window starts may be the earliest on-duration period after determining whether to perform the resource sensing operation among on-duration periods of the first terminal. In this case, Method 15 or Method 16 below may be performed.

Method 15: When the length of the resource sensing window is L, the first terminal may perform a resource sensing operation only in on-duration period(s) of the first terminal from a current time. The length of accumulated on-duration periods in which the resource sensing operation is performed may not exceed L. The first terminal may perform a resource selection operation in on-duration period(s) of the first terminal after completion of the resource sensing operation. L may be in units of a symbol, mini-slot, slot, or millisecond. When the length of (n on-duration periods (e.g., on-duration #1 to #n)+a portion of the on-duration #n+1) is L, the first terminal may stop the resource sensing operation at an end time of the portion of the on-duration #n+1. Thereafter, the first terminal may perform a resource selection operation. Accordingly, the first terminal may perform the resource selection operation after the portion of the on-duration #n+1. n may be a natural number. Alternatively, the first terminal may perform the resource sensing operation in the on-duration #n+1 and may perform the resource selection operation in on-duration(s) after the on-duration #n+1. Alternatively, the first terminal may stop the resource sensing operation at the end time of the portion of the on-duration #n+1 and may perform the resource selection operation in on-duration(s) after the on-duration #n+1.

Method 16: The resource sensing window may be configured as n on-duration periods. n may be a natural number. The n on-duration periods may be on-duration periods of the first terminal. The first terminal may perform a resource sensing operation in n on-duration periods of the first terminal from a current time. The number of accumulated on-duration periods in which the resource sensing operation is performed may not exceed n. The first terminal may perform a resource selection operation in on-duration period(s) of the first terminal after completion of the resource sensing operation. When the resource sensing window is configured as n on-duration periods, the resource sensing operation may be performed in consecutive n on-duration periods (e.g., on-duration #1 to #n). The first terminal may perform a resource selection operation in the on-duration #n+1 after n consecutive on-duration periods (e.g., on-durations #1 to #n).

Methods extended based on the above methods and/or combined forms of the above methods may be used.

The first terminal (e.g., transmitting terminal) may perform a resource sensing operation in a resource sensing window. When a degree of congestion is greater than or equal to a threshold in the resource sensing window, the first terminal may continue performing the resource sensing operation without performing a resource selection operation. Accordingly, the resource sensing operation may be re-performed. The degree of congestion may be determined based on a CBR and/or CR. A communication node (e.g., base station and/or another transmitting terminal) may signal the threshold, which is a criterion for determining the degree of congestion, to the first terminal. The above threshold may be signaled using at least one of system information, RRC message, MAC CE, or control information (e.g., DCI, SCI). The resource sensing operation may be re-performed as follows.

In the above-described Method 15 and/or Method 16, when the degree of congestion is equal to or greater than the threshold (e.g., when resource selection is impossible), the first terminal may perform the resource sensing operation in the resource sensing window (e.g., resource sensing window having the length L or resource sensing window including n on-duration periods). The first terminal may then perform the resource sensing operation continuously. Accordingly, the resource sensing operation may be re-performed.

When the degree of congestion is less than the threshold, the first terminal may terminate the resource sensing operation. Thereafter, the first terminal may perform a resource selection operation in the earliest on-duration period overlapping with the resource selection window among the on-duration periods of the first terminal. In the above-described embodiments, method(s) below may be used.

Method 17: The first terminal may stop the resource sensing operation in a specific time period before re-performing the resource sensing operation and may perform the resource sensing operation after the specific time period. The specific time period may be configured to be associated with the DRX cycle.

Method 18: The number of times the resource sensing operation is re-performed may be limited. When the maximum number of re-performing the resource sensing operation is set to 3, the first terminal may continuously perform two resource sensing operations after performing an initial resource sensing operation. Thereafter, the first terminal may stop the resource sensing operation. In addition, the resource selection operation may be stopped.

Method 19: The threshold, which is the criterion for determining the degree of congestion, may be configured to change according to the number of times the resource sensing operation is re-performed. For example, the threshold may decrease as the number of re-performing the resource sensing operation increases. Alternatively, the threshold may increase as the number of re-performing the resource sensing operation increases.

A communication node (e.g., base station and/or another transmitting terminal) may transmit the above-described parameter(s) (e.g., threshold that is the criterion for determining the degree of congestion, specific time period, and/or maximum number of re-performing the resource sensing operation) to the first terminal using at least one of system information, RRC message, MAC CE, or control information (e.g., DCI, SCI). Methods extended based on the above methods and/or combined forms of the above methods may be used. In the above-described embodiments, the resource sensing operation of the first terminal may be performed not only in on-duration(s) but also in off-duration(s).

[Resource Sensing/Selection Operation of First Terminal Supporting Both-Direction DTRX Operation]

A per-direction DTRX operation and a per-direction DRX operation may be simultaneously performed on one link. The above-described operation may be referred to as "both-direction (or bi-directional) DTRX operation." When a both-direction DTRX operation is performed in the embodiment of FIG. 7, the first terminal (e.g., transmitting terminal) may perform a transmission operation or a reception operation based on DRX configuration information configured in the first terminal, and the second terminal (e.g., receiving terminal) may perform a reception operation based on DRX configuration information configured in the second terminal. The DRX configuration information of the first terminal may be configured identically to the DRX configuration information of the second terminal. Alternatively, the DRX configuration information of the first terminal may be configured differently from the DRX configuration information of the second terminal. The first terminal may perform a resource sensing operation based on Method 20 and/or Method 21 below for data transmission.

Method 20: When the length of a resource sensing window configured in the first terminal is L, the first terminal may perform a resource sensing operation only in on-duration period(s) of the first terminal from a current time. The length of accumulated on-duration periods in which the resource sensing operation is performed may not exceed L. L may be in units of a symbol, mini-slot, slot, or millisecond. After the resource sensing operation is completed, the first terminal may perform a resource selection operation in a first period (hereinafter referred to as "initial overlapping period") in which an on-duration period of the first terminal and an on-duration period of the second terminal overlap. In embodiments, an overlapping period may mean the initial overlapping period or an overlapping period after the initial overlapping period. Alternatively, the first terminal may continuously (e.g., additionally) perform the resource sensing operation in a period from an end time of the resource sensing operation to a time before a start time of the overlapping period (e.g., initial overlapping period). The first terminal may perform a resource selection operation in the overlapping period. When the resource sensing window ends within the overlapping period, the first terminal may stop the resource sensing operation at an end time of the resource sensing window and may perform a resource selection operation. Accordingly, the first terminal may perform the resource selection operation from the end time of the resource sensing window within the overlapping period. Alternatively, the first terminal may stop the resource sensing operation after the end time of the resource sensing window within the overlapping period and may perform a resource selection operation in the next overlapping period. Alternatively, regardless of the end time of the resource sensing window, the first terminal may continuously perform the resource sensing operation until the overlapping period (e.g., initial overlapping interval) and may perform the resource selection operation in the next overlapping period.

Method 21: The resource sensing window may be configured as n on-duration periods. In an example, n may be a natural number. The first terminal may perform a resource sensing operation in n on-duration periods of the first terminal from a current time. The number of accumulated on-duration periods in which the resource sensing operation is performed may not exceed n. After the resource sensing operation is completed, the first terminal may perform a resource selection operation in a period (i.e., overlapping period) in which an on-duration period of the first terminal and an on-duration period of the second terminal overlap. When the resource sensing window is configured as n on-duration periods, the resource sensing operation may be performed in consecutive n on-duration periods (e.g., on-duration #1 to #n). The first terminal may perform a resource selection operation in the overlapping period. The first terminal may stop the resource sensing operation in a period from an end time of the resource sensing operation to before a start time of the overlapping period. Alternatively, the first terminal may continuously perform the resource sensing operation in the period from the end time of the resource sensing operation to the start time of the overlapping period.

The first terminal (e.g., transmitting terminal) may perform the resource sensing operation in a resource sensing window. When a degree of congestion is greater than or equal to a threshold in the resource sensing window, the first terminal may continue performing the resource sensing operation without performing a resource selection operation. Accordingly, the resource sensing operation may be re-performed. The degree of congestion may be determined based on a CBR and/or CR. A communication node (e.g., base station and/or another transmitting terminal) may signal the threshold, which is a criterion for determining the degree of congestion, to the first terminal. The above threshold may be signaled using at least one of system information, RRC message, MAC CE, or control information (e.g., DCI, SCI). The resource sensing operation, according to an embodiment, may be re-performed as follows.

In the above-described Method 20 and/or Method 21, when the degree of congestion is equal to or greater than the threshold (e.g., when resource selection is impossible), the first terminal may perform the resource sensing operation in the resource sensing window (e.g., resource sensing window having the length L or resource sensing window including n on-duration periods). The first terminal may then perform the resource sensing operation continuously. Accordingly, the resource sensing operation may be re-performed.

When the degree of congestion is less than the threshold, the first terminal may terminate the resource sensing operation. Thereafter, the first terminal may perform a resource selection operation in an initial overlapping period. In the above-described embodiments, method(s) below may be used.

Method 22: The first terminal may stop the resource sensing operation in a specific time period before re-performing the resource sensing operation. The first terminal may perform the resource sensing operation after the specific time period. The specific time period may be configured to be associated with the DRX cycle.

Method 23: The number of times the resource sensing operation is re-performed may be limited. When the maximum number of re-performing the resource sensing operation is set to 3, the first terminal may continuously perform two resource sensing operations after performing an initial resource sensing operation. Thereafter, the first terminal may stop the resource sensing operation. In addition, the resource selection operation may be stopped.

Method 24: The threshold, which is the criterion for determining the degree of congestion, may be configured to change according to the number of times the resource sensing operation is re-performed. For example, the threshold may decrease as the number of re-performing the resource sensing operation increases.

Alternatively, the threshold may increase as the number of re-performing the resource sensing operation increases.

A communication node (e.g., base station and/or another transmitting terminal) may transmit the above-described parameter(s) (e.g., threshold value that is the criterion for determining the degree of congestion, specific time period, and/or maximum number of re-performing the resource sensing operation) to the first terminal using at least one of system information, RRC message, MAC CE, or control information (e.g., DCI, SCI). Methods extended based on the above methods and/or combined forms of the above methods may be used. In the above-described embodiments, the resource sensing operation of the first terminal may be performed not only in on-duration period(s) but also in off-duration period(s).

[Method of Operating Per-Direction DRX Operation, Per-Direction DTRX Operation, and/or Both-Direction DTRX Operation]

In the embodiment of FIG. 7, the first terminal may be a transmitting terminal or a receiving terminal for another sidelink. Alternatively, the first terminal may be a receiving terminal for a Uu link with the base station. The second terminal may be a transmitting terminal or a receiving terminal for another sidelink. Alternatively, the second terminal may be a receiving terminal for a Uu link with the base station. When a DRX operation is possible in the sidelink between the first terminal and the second terminal, depending on whether DRX operations are supported on all links connected to the first terminal and the second terminal and/or DRX configuration information, DRX operations of each of the first terminal and the second terminal may not be possible.

Figure 8:
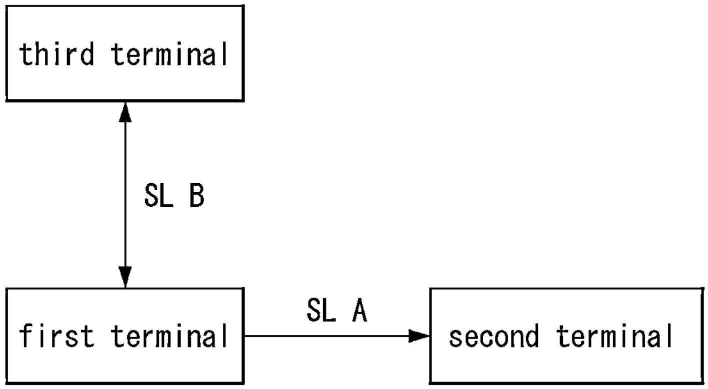
FIG. 8 is a conceptual diagram illustrating another embodiment of sidelink communication supporting DRX operations.

FIG. 8 is a conceptual diagram illustrating a second embodiment of sidelink communication supporting DRX operations.

As shown in FIG. 8, communication between a first terminal and a second terminal may be performed on a SL A, and communication between the first terminal and a third terminal may be performed on a SL B. The first terminal may perform a function of a transmitting terminal or a receiving terminal on the SL B. Even when DRX operations are possible on the SL A, if communication between the first terminal and the third terminal is performed on the SL B, the first terminal may not be able to perform DRX operations.

Figure 9:
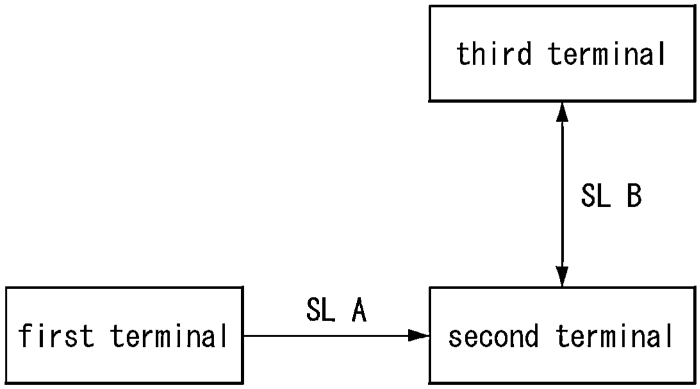
FIG. 9 is a conceptual diagram illustrating another embodiment of sidelink communication supporting DRX operations.

FIG. 9 is a conceptual diagram illustrating a third embodiment of sidelink communication supporting DRX operations.

As shown in FIG. 9, communication between a first terminal and a second terminal may be performed on a SL A, and communication between the second terminal and a third terminal may be performed on a SL B. The second terminal may perform a function of a transmitting terminal or a receiving terminal on the SL B. Even when DRX operations are possible on the SL A, if communication between the second terminal and the third terminal is performed on the SL B, the second terminal may not be able to perform DRX operations.

FIG. 10 is a conceptual diagram illustrating a fourth embodiment of sidelink communication supporting DRX operations.

As shown in FIG. 10, communication between a first terminal and a second terminal may be performed on a SL A. Communication between the first terminal and a third terminal may be performed on a SL B. Communication between the second terminal and a fourth terminal may be performed on a SL C. The first terminal may perform a function of a transmitting terminal or a receiving terminal on the SL B, and the second terminal may perform a function of a transmitting terminal or a receiving terminal on the SL C. Even when DRX operations are possible on the SL A, if communication between the first terminal and the third terminal is performed on the SL B and communication between the second terminal and the fourth terminal is performed on the SL C, each of the first terminal and the second terminal may not be able to perform DRX operations.

The above-described terminals may not be able to perform DRX operations on the SL when they do not support DRX operations.

FIG. 11 is a conceptual diagram illustrating DRX operation modes applicable to sidelink communication, according to one embodiment.

As shown in FIG. 11, when DRX operations are possible on a sidelink (e.g., SL A) between a first terminal and a second terminal, a DRX operation mode of each of the first terminal and the second terminal may be determined based on whether a DRX operation is performed on another link (e.g., SL B and/or SL C) connected to each terminal, DRX configuration information for another SL connected to each terminal, and/or capability of each terminal for DRX operations.

In Case 1, because the first terminal and the second terminal are able to perform DRX operations, DRX operation modes (e.g., applicable DRX operation modes) may include the per-direction DTRX operation, per-direction DRX operation, and both-direction DTRX operation. In addition, the DRX operations may be configured not to be performed. Accordingly, in Case 1, the DRX operation modes may include "No DRX operation." In Case 2, the first terminal may not be able to perform DRX operations, and the second terminal may be able to perform DRX operations. In this case, the DRX operation modes in Case 2 may include the per-direction DRX operation and/or "No DRX operation."

In Case 3, the first terminal may be able to perform DRX operations, and the second terminal may not be able to perform DRX operations. In this case, in Case 3, the DRX operation modes may include the per-direction DTRX operation and/or "No DRX operation." In Case 4, since the first terminal and the second terminal may not be able to perform DRX operations, the DRX operation mode may be "No DRX operation."

The DRX operation modes used in each case may be configured in the terminal(s) by higher layer signaling (e.g., system information, RRC message, and/or MAC CE). Alternatively, the DRX operating modes used in each case may be determined based on specific condition(s) (e.g., cast type and/or congestion). Various DRX operation modes may be operated in conjunction. For example, a specific DRX operation mode may or may not be performed according to DRX configuration information.

Embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those having ordinary skill in the art to which the present disclosure pertains.

Examples of the computer readable medium may include a hardware device such as ROM, RAM, and flash memory, which may be specifically configured to store and execute the program instructions. Examples of the program instructions include machine codes made by, for example, a compiler, as well as high-level language codes executable by a computer, using an interpreter. The hardware device may be configured to operate as at least one software module in order to perform the embodiments of the present disclosure, and vice versa.

While embodiments of the present disclosure and their advantages have been described in detail, it should be understood that various changes, substitutions and alterations may be made without departing from the scope of the present disclosure.

What is claimed is:

1. A method of a first user equipment (UE), the method comprising:

performing a resource sensing operation in consideration of a discontinuous reception (DRX) cycle of a second UE performing a DRX operation;

performing a resource selection operation based on a result of the resource sensing operation in an on-duration period within the DRX cycle; and performing sidelink communication with the second UE using transmission resources selected by the resource selection operation, wherein:

the resource sensing operation is performed in a resource sensing window and the resource selection operation is performed in a resource selection window, and based on a start time of the resource sensing window being before a time obtained by subtracting a length of the resource sensing window from a start time of the resource selection window, the resource sensing operation is further performed during a period from an end time of the resource sensing window to the start time of the resource selection window.

2. The method of claim 1, wherein the on-duration period of the second UE existing after the end time of the resource sensing window is configured as the resource selection window.

3. The method of claim 1, wherein:

the resource sensing operation is performed in one or more on-duration periods configured in the second UE; and a length of the one or more on-duration periods does not exceed the length of the resource sensing window configured for the resource sensing operation.

4. The method of claim 1, wherein:

the resource sensing window includes n on-duration periods configured in the second UE; and the resource sensing operation is performed in the n on-duration periods, wherein n is a natural number.

5. The method of claim 1, wherein performing the resource sensing operation includes:

performing the resource sensing operation in a first resource sensing window; and re-performing the resource sensing operation after the first resource sensing window when a degree of congestion in the first resource sensing window is greater than or equal to a threshold.

6. The method of claim 5, wherein re-performing the resource sensing operation is performed by a maximum number of retransmissions, and the maximum number of retransmissions is set by higher-layer signaling.

7. The method of claim 1, wherein when a degree of congestion is less than a threshold in a resource sensing window in which the resource sensing operation is performed, the resource selection operation is performed after the resource sensing operation.

* * * * *